(12) United States Patent
Mekhtarian

(10) Patent No.: US 10,595,387 B2
(45) Date of Patent: Mar. 17, 2020

(54) DRIVELESS LED FIXTURE

(71) Applicant: George Mekhtarian, Hermosa Beach, CA (US)

(72) Inventor: George Mekhtarian, Hermosa Beach, CA (US)

( * ) Notice: Subject to any disclaimer, the term of this patent is extended or adjusted under 35 U.S.C. 154(b) by 0 days.

(21) Appl. No.: 16/261,932

(22) Filed: Jan. 30, 2019

(65) Prior Publication Data

US 2019/0191513 A1    Jun. 20, 2019

Related U.S. Application Data

(63) Continuation of application No. 15/844,958, filed on Dec. 18, 2017, now abandoned.

(51) Int. Cl.
| | |
|---|---|
| *H05B 33/08* | (2020.01) |
| *H05B 45/00* | (2020.01) |
| *A01G 9/20* | (2006.01) |
| *H05B 45/37* | (2020.01) |
| *H05B 45/50* | (2020.01) |

(52) U.S. Cl.
CPC .............. *H05B 45/00* (2020.01); *A01G 9/20* (2013.01); *H05B 33/0815* (2013.01); *H05B 45/37* (2020.01); *H05B 45/50* (2020.01)

(58) Field of Classification Search
CPC combination set(s) only.
See application file for complete search history.

(56) References Cited

U.S. PATENT DOCUMENTS

| | | | | |
|---|---|---|---|---|
| 2005/0281030 | A1* | 12/2005 | Leong | F21V 23/0471 362/234 |
| 2010/0020536 | A1* | 1/2010 | Bafetti | F21K 9/00 362/231 |
| 2010/0060175 | A1* | 3/2010 | Lethellier | H05B 33/0815 315/164 |
| 2011/0209400 | A1* | 9/2011 | Rooymans | A01G 7/045 47/17 |
| 2013/0026925 | A1* | 1/2013 | Ven | H05B 33/0824 315/122 |

* cited by examiner

*Primary Examiner* — Jimmy T Vu
(74) *Attorney, Agent, or Firm* — Irving Keschner

(57) ABSTRACT

A group of LED fixtures wherein power is delivered to each fixture in the group from central power unit thus eliminating the necessity of providing a separate power sauce to each fixture.

3 Claims, 4 Drawing Sheets

DRIVELESS LED FIXTURE

RELATED APPLICATIONS

This application is continuing application of application Ser. No. 15/844,958 filed on Dec. 18, 2017.

BACKGROUND OF THE INVENTION

1. Field of the Invention

The present invention relates to groups of LED fixtures and, in particular, reducing the cost thereof by centralizing the AC-DC conversion and current control functions.

2. Description of the Prior Art

Conventional LED fixtures comprises three major parts:
(a) LED diodes (when mounted on metal clad boards they are often referred to as light modules or light engines);
(b) Driver (provides for AC-to-DC conversion, filtering, transient protection, constant current power supply; and
(c) Housing (primarily used as heat sink).
The fixture can also include secondary optics or lenses.
While LED prices are decreasing, and performance is increasing, the driver and housing costs tend to remain the same.

Large commercial installations may utilize hundreds or thousands of LED fixtures, each including its own expensive AC-DC driver circuit.

Typically, power from the power mains are specified at 480V, 60 Hz AC, Triple phase. As noted above, power needs to be supplied to individual fixtures of LEDs lights. The desired LEDs require 20V DC at 7.5 A and power to be current regulated and maintained steady at 7.5 A.

A current method (FIG. 2A) for accomplishing this utilizes individual drivers on each fixture—LED drivers that are connected to the main power line. Power electronics are required to convert AC to DC, step down the voltage and regulate the current to the LEDs. However, this requires expensive electronics for and power line wiring to each fixture.

In a possible alternative (FIG. 2B), a centralized AC-DC system with a step down power source is utilized. A number of fixtures are connected in parallel (for example 20 fixtures) and power is supplied using a large AC-DC power source that delivers 20V at 150 amps. However, 150 amps at 20 VDC requires large gauge wires (especially over the long distances in a greenhouse installation) which can significantly increase costs and suffer from major line losses, reducing efficiency. The large AC-DC power source is expensive and in the end may not deliver much savings over the current method noted above. In addition, some electronics are still required in each fixture to provide current regulation.

What is desired is to provide a multi-LED fixture system wherein the LED fixtures are grouped and wherein the AC-DC conversion process and current control functions are centralized at a reduced cost.

SUMMARY OF THE INVENTION

The present invention provides a LED fixture system wherein the fixtures (or luminaires) are segregated into groups of between 20-30, connected in series, and wherein a central power unit is utilized to centralize the AC-DC conversion and current control functions, thus reducing system cost by reducing the number of driver circuits required. A failed LED bypass circuit inside each fixture allows the system to function when one or more of the fixtures in the chain happen to fail open circuit (FIG. 3.)

A centralized power source converts the AC power input to a DC between 300 and 500V. Current regulation is performed inside the centralized power source. Each central power unit can thus drive approximately 30 luminaires in series (FIG. 2C).

A low-cost central power source is utilized without the necessity of individual LED driver for each fixture and without the need for an electrician to install an individual power box for each fixture. The line losses are minimum since the voltage is high and current relatively low, less than 15 amps. The system is such that up to 30% of the fixtures in the series can fail and the rest of the system will still operate.

DESCRIPTION OF THE DRAWINGS

For a better understanding of the present invention as well as other objects and further features thereof, reference is made to the following description which is to be read in conjunction with the accompanying drawing therein.

DESCRIPTION OF THE INVENTION

Figure 1:
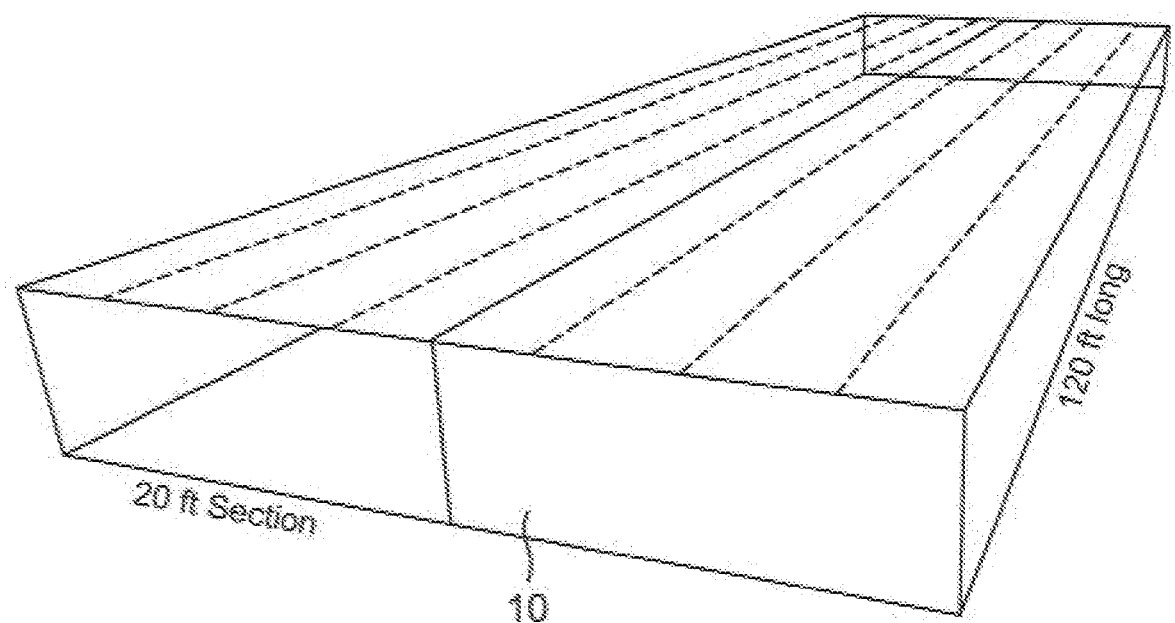
FIG. 1 illustrates a perspective view of a conventional LED grow system.

FIG. 1 is a simplified perspective view of a typical greenhouse 10 in which the power distribution system of the present invention can be utilized. Greenhouses, especially when located in the middle and high latitudes require supplemental artificial lighting in order to grow crops, such as tomatoes, year-round.

The dimensions of a typical section of a greenhouse configuration are as follows:
Length: Typically between 100 and 120 feet.
Width: 20 feet per section width
LED lights: 11,12,13 Multiple rows (3 shown) approximately 4 feet apart in length;
Since lights (fixtures) are typically hung every 4 feet, there are from 25 to 30 light fixtures per row.

Figure 2A:
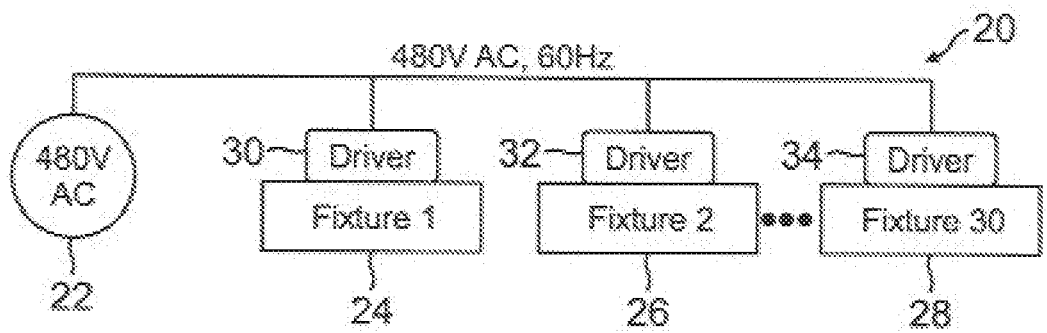
FIG. 2A is a simplified block diagram of a prior art power distribution system that can be used in conjunction with the LED grow system shown in FIG. 1.

FIG. 2A is a block diagram of a current method for providing power to a power distribution system 20.

System 20 is powered by a source 22 of 480 volts, 60 Hz AC which is coupled to a series of fixtures 24 and 26 and the last fixture 28 in a row via driver circuits 30, 32 and 34, respectively.

Figure 2B:
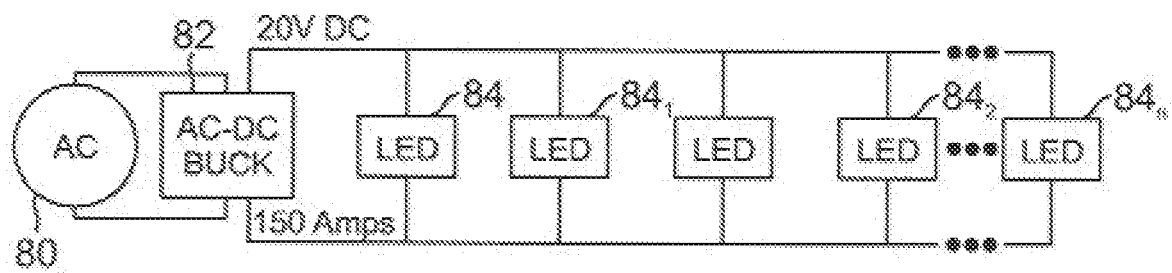
FIG. 2B is a simplified block diagram of a possible power distribution system that could be utilized in the grow system of FIG. 1.

FIG. 2B is a block diagram of a power distribution system that may be used in place of the system shown in FIG. 2A. A source of AC power 80 is coupled to step-down device 82 which provides 20 VDC and 150 amps to a series of LED fixtures 84, $84_1$, 84, . . . $84_n$. The fixtures may contain some power electronics for current regulation. In this case, if each LED fixture requires 7.5 amps, 150 amps is sufficient for 20 fixtures.

The disadvantages of the power distribution systems shown in FIGS. 2A-2B have been set forth hereinabove.

Figure 2C:
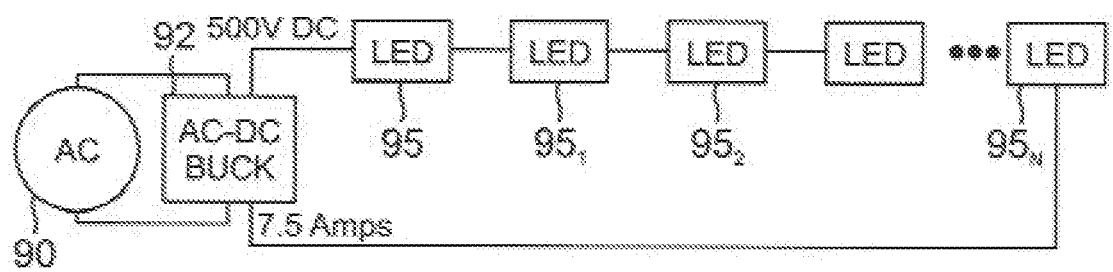
FIG. 2C is a block/circuit diagram of the power distribution system of the present invention.

FIG. 2C illustrates a block diagram of a system in accordance with the teachings of the present invention. A source of AC power 90 is coupled to AC-DC converter 92 which generates 500 VDC, 7.5 amp output to a series of LED fixtures $95, 95_1, 95_2, \ldots 95_n$ as illustrated. The fixtures simply consist of LEDs mounted on a printed circuited board and coupled to a proper heat sink which can be the fixture housing.

Figure 3:
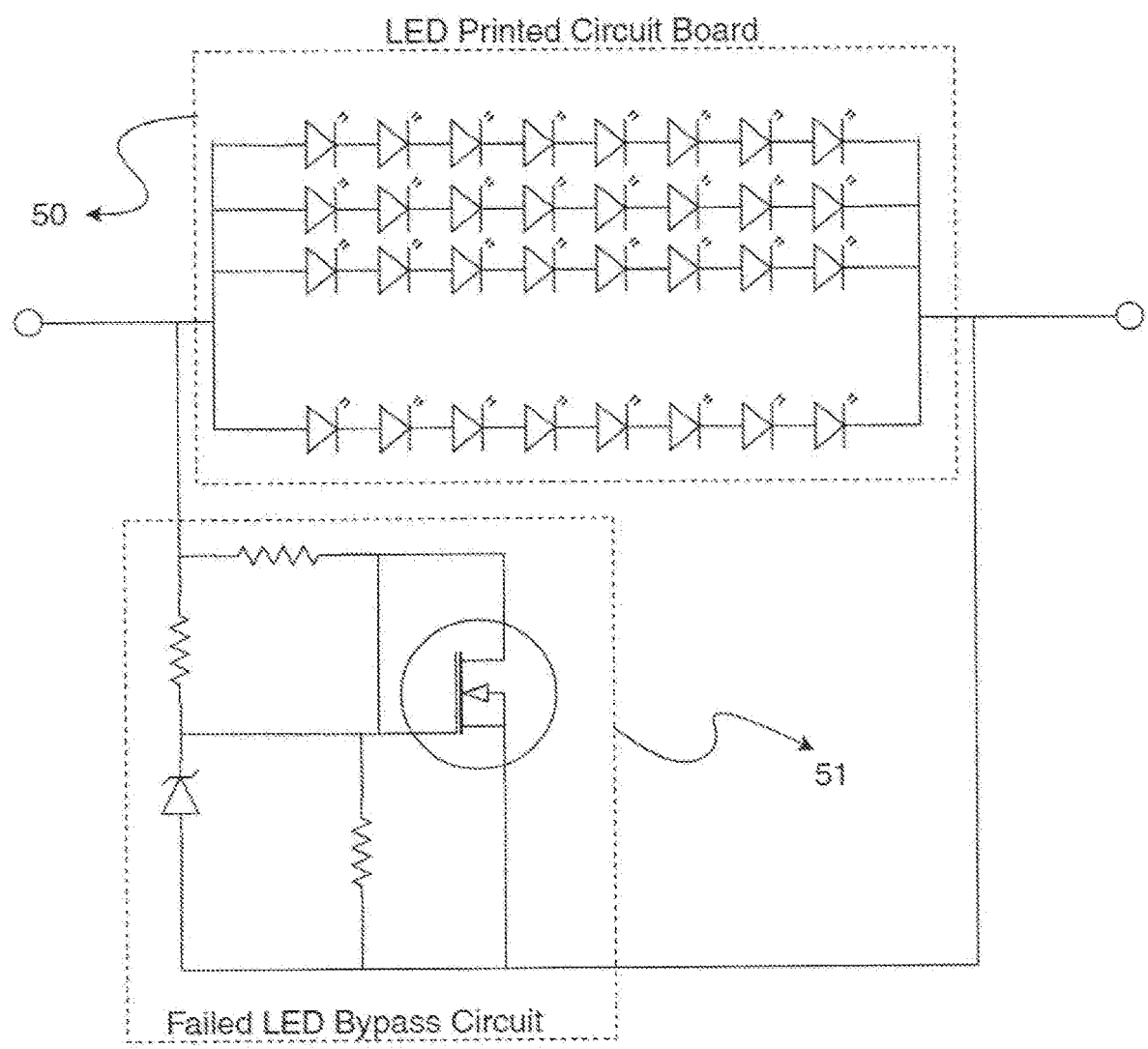
FIG. 3 is a circuit diagram of the failed LED bypass circuit.

FIG. 3 illustrates a failed LED bypass circuit. The LED circuit board 50 contains several LEDs connected in series-parallel fashion as shown. LEDs normally fail open circuit. When one or more of the LEDs in each series fails the current will no longer pass to downstream fixtures in the system causing all fixtures in the system to shut down. The bypass circuit 51 will then trigger on, bypassing the LEDs on the failed fixture and allowing the remainder of the fixtures in the system to function as normal.

Figure 4:
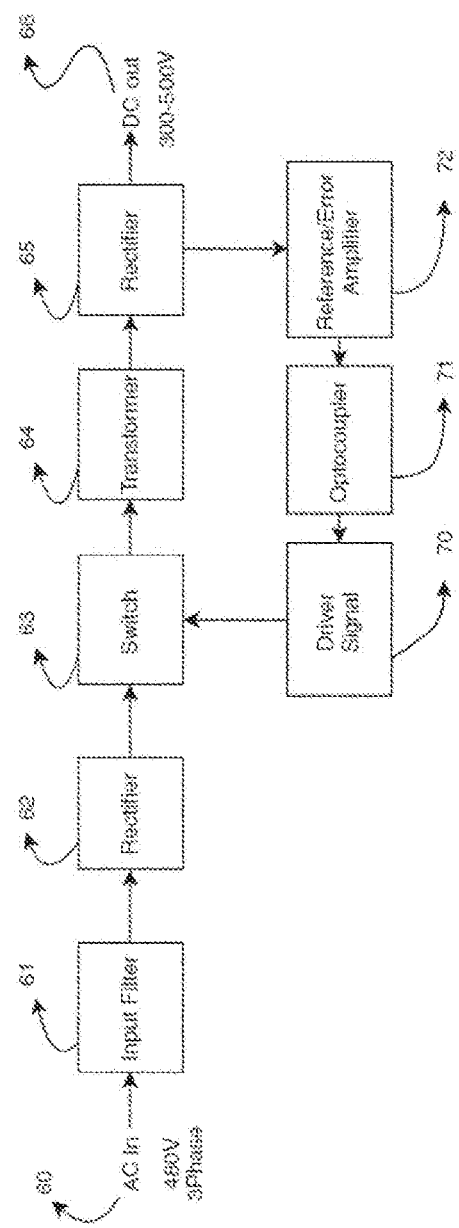
FIG. 4 is a block diagram of the central power source.

FIG. 4 illustrates a block diagram of the central power unit. Three phase AC at 480V is applied to the unite 60. Power goes through the EMI filter 61 and then through a bridge rectifier 62 to the main switch 63. A transformer 64 provides galvanic isolation. Power from the transforms 64 is then rectified to DC via unit 65 and regulated through a feedback loop consisting of the reference or error amplifier 72, an optocoupler 71 and a driver signal generator 70. The power output of the Central Power Supply Unit appears at 66 and is constant DC 300 to 500V unit max current of 7.5 Amps.

Specifications for central power unit in FIG. 4 are as follows:
Power input configuration: Triple phase, 480 Volts
Triple phase, 240 Volts
Two phase, 480 Volts
Two Phase, 240 Volts
Specifications for the Drive Circuits are as follows:
480V: 20 to 50 fixtures in series
240V: 12-15 fixtures in series
Input voltage per fixture: 16-20 volts
LED Load
Total voltage: 20 Volts
Total Amperes: 7.5 Amps
LED Arrangement: 8×10
Total power: 150 watts.

In summary, power distributed to the fixtures using, a 500V DC at 7.5 amps input. No power electronics circuitry is required in fixtures. The fixtures being driven in series so that in a system of 25 fixtures, each would receive approximately 20 volts which minimizes the insulation required at each fixture. Protective circuits may be provided to protect the LEDs against power transients such as lighting, power spikes, etc. In addition, a failed LED bypass circuit may be added to each fixture to allow the system to function when or more of the fixtures in the series fail.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A LED fixture system comprising:
   a plurality of LEDs, said LEDs connected in series as a plurality of arrays, said arrays being connected in parallel;
   a printed circuit board, said plurality of LEDs being mounted to said printed circuit board, said printed circuit board being coupled to a bypass circuit wherein is one or more LEDs fail causing an open circuit, the remainder of the circuit will remain energized;
   a plurality of LED fixtures, said printed circuit board being coupled to said fixtures;
   a central power unit having an input and an output, said central power unit being coupled to said plurality of LED fixtures; and
   a power source coupled to said central power unit, application of power to said central power unit causing said LEDs to generate light.

2. The system of claim 1 wherein the output of said central power unit is between 300 and 500 VDC.

3. The system of claim 2 wherein said central power unit provides a constant controlled current and delivers approximately between 3 and 200 amps.

* * * * *